July 27, 1954
J. M. JONES ET AL
2,684,500
APPARATUS FOR DEVEINING SHRIMP
Filed March 5, 1952
4 Sheets-Sheet 1
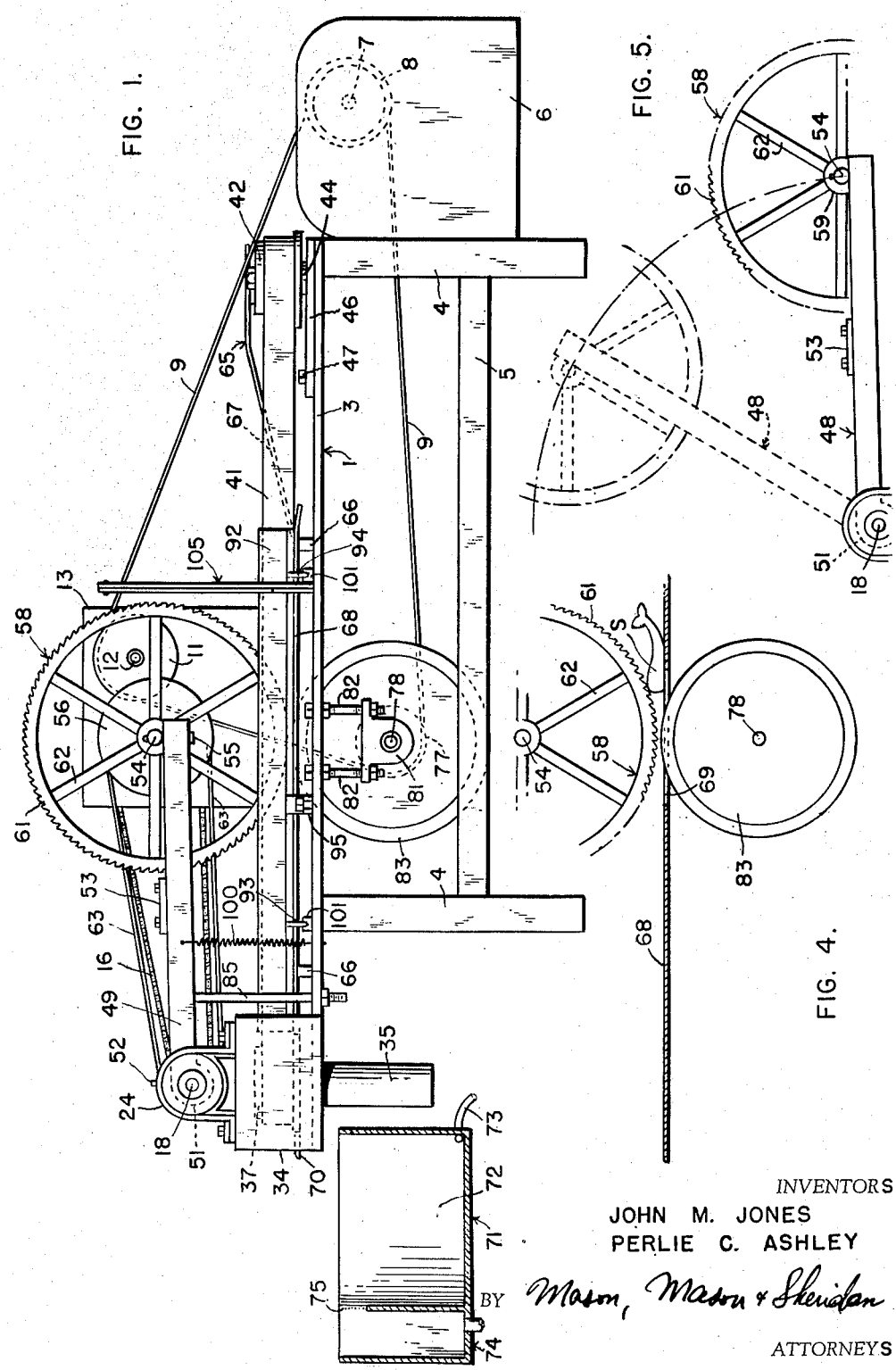
INVENTORS
JOHN M. JONES
PERLIE C. ASHLEY
BY *Mason, Mason & Sheridan*
ATTORNEYS

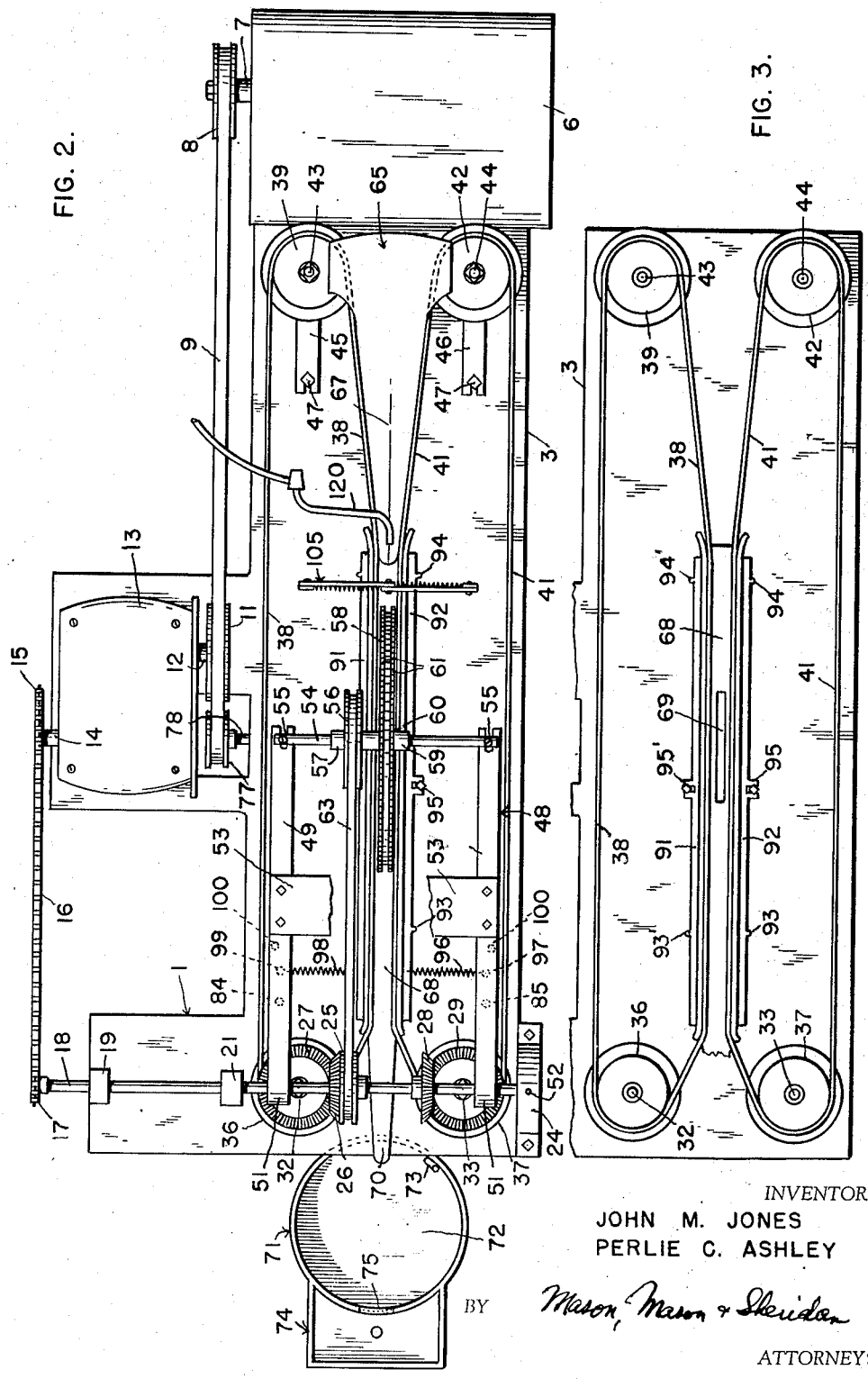

July 27, 1954  J. M. JONES ET AL  2,684,500
APPARATUS FOR DEVEINING SHRIMP
Filed March 5, 1952  4 Sheets-Sheet 3
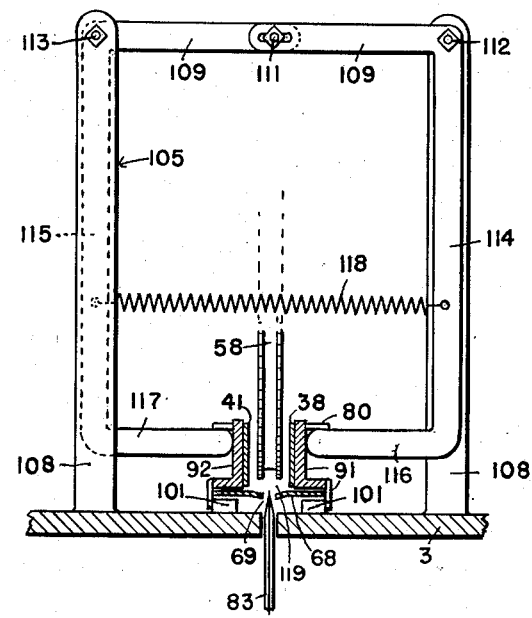
FIG. 6.
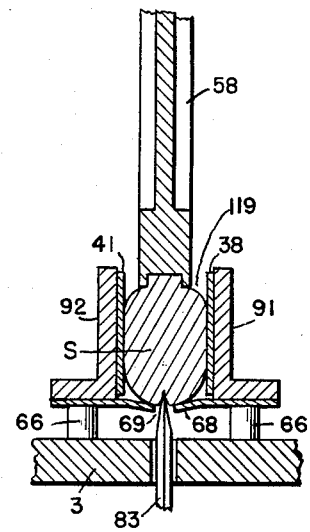
FIG. 7.
FIG. 12.
FIG. 8.
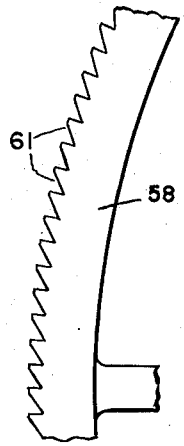
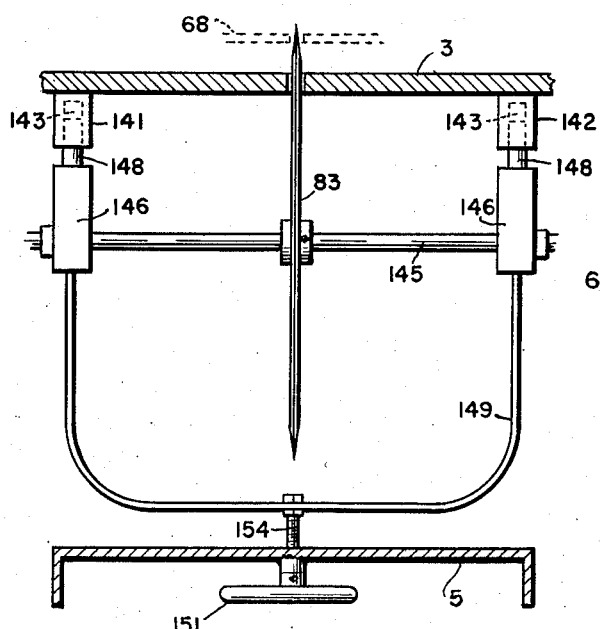
FIG. 9.
INVENTORS
JOHN M. JONES
PERLIE C. ASHLEY
BY Mason, Mason & Sheridan
ATTORNEYS

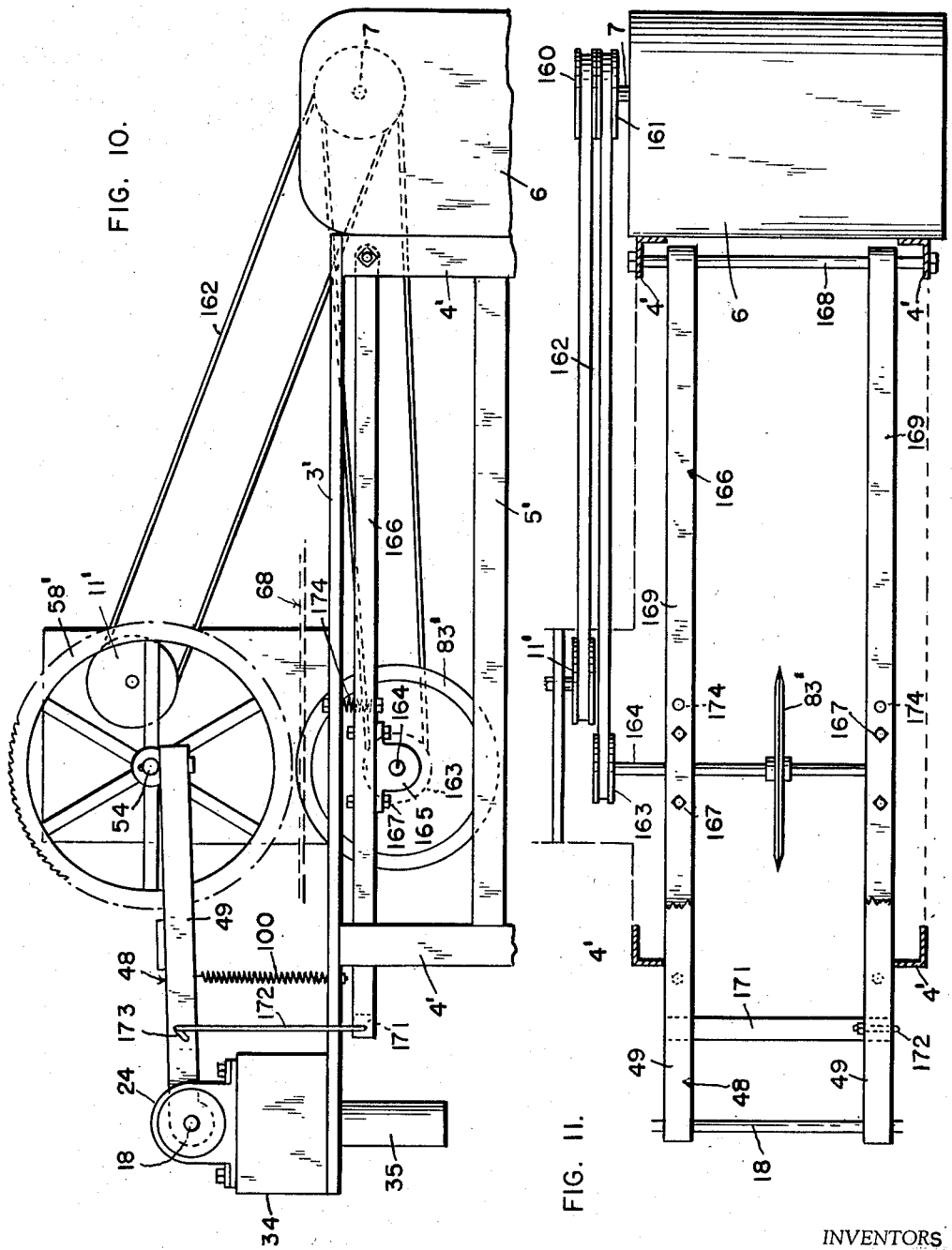

Patented July 27, 1954

2,684,500

UNITED STATES PATENT OFFICE 2,684,500

APPARATUS FOR DEVEINING SHRIMP

John M. Jones and Perlie C. Ashley, Edenton,
N. C., assignors, by direct and mesne assignments, to Burton H. Jones, Edenton, N. C.

Application March 5, 1952, Serial No. 274,866

9 Claims. (Cl. 17—2)

This invention relates to apparatus for treating shrimp and particularly to means for cutting and slitting the back of shrimp for deveining purposes.

There is considerable prior art disclosing apparatus for deveining shrimp comprising generally a trough or the like into which shrimp are fed, feeding means for feeding the shrimp through said trough, cutting means for cutting a certain section of the shrimp as they pass through the trough, and presser means freely movable up and down and adapted to press the shrimp against the cutting means.

The present invention also includes a substantially similar arrangement, but adds several improvements which provide a more efficient machine, permit treating of a larger number of shrimp and is adapted to accommodate shrimp of all sizes and shapes.

Broadly, the improvements of the present invention are in the provision of a mere cutting blade, instead of a saw, which acts to split a section of the shrimp instead of ripping the section apart and in the provision of holding means for retaining the shrimp in position against the blade, which includes serrated teeth that assist in conveying the shrimp past the cutting means in the trough and thereby prevents any slippage when the shrimp contact the cutting means. Also, means is provided for synchronizing the speed of rotation of the holding means with the driving speed of the feeding means.

In the prior art devices, difficulty has been encountered in maintaining shrimp of varying sizes centered between the cutting means and the presser, or holding, means. This invention includes apparatus for overcoming this difficulty. Specifically, the present invention includes an equalizer having pivoted arms maintained under tension which engage shiftable members abutting the feeding means, which constitute the sides of a major portion of the trough, and are arranged in a manner whereby an outward force exerted on one arm will permit the feeding means and shiftable member adjacent that arm to be moved laterally a certain distance and at the same time ensure that the other arm of the equalizer, its corresponding shiftable member and feeding means will similarly be moved an identical distance, and such operation necessarily widens the trough. Accordingly, by having identical lateral movement on each side of the trough, the shrimp entering the trough is maintained centered over the blade and beneath the holding member regardless of the size of the shrimp, and this ensures splitting or cutting all shrimp at the same part of their bodies.

Also in prior art devices difficulty has been encountered in having the cut or slit in the back of the shrimp other than uniform or constant from adjacent the head of the shrimp or the neck thereof to its tail section. In other words, if a cutting blade is set to cut or slit the back of the shrimp one-eighth of an inch deep, since the holding member is arranged to urge the shrimp adjacent the cutting means, the cut is one-eighth of an inch throughout the shrimp from head to tail. This results, as the overall diameter of shrimp is by no means uniform, in cutting some portions of the shrimp deeper than is required to devein and other portions of the shrimp not as deep as desired. Therefore, there is considerable waste of meat.

The present invention also overcomes this problem and provides an arrangement for automatically varying the cutting depth depending on the diameter of the shrimp throughout its area. In other words, if the tail of the shrimp is one-half inch in diameter, a cut of, for example, one-eighth of an inch will be made, and, if the shrimp is one inch in diameter adjacent the head portion, a cut of, for example, one-fourth inch will be made, and between these areas the cutting depth will be varied depending upon the diameter, all of this adjustment in the cutting depth being carried out automatically.

The primary object of this invention, therefore, is in the provision of apparatus for cutting shrimp for deveining purposes, including a frame upon which is mounted a trough into which the shrimp are fed, feeding means for conveying said shrimp through said trough, said feeding means constituting the sides of a major portion of said trough, cutting means for splitting the shrimp from adjacent the normally removed head portion, or the neck, thereof, to the tail thereof, holding means for maintaining the shrimp in contact with said cutting means, said holding means having means cooperating with said feeding means for assisting the conveying of said shrimp through said trough and preventing slippage, and means for synchronizing the speed of rotation of said holding means and said feeding means.

Another object of this invention is in the provision of a machine for deveining shrimp including cutting means, feeding means and means for holding the shrimp in contact with the cutting means, means for driving the holding means and feeding means in synchronism and means for maintaining said shrimp centered between said cutting means and holding means, regardless of the size and shape of said shrimp.

A still further object of this invention is in the provision of apparatus for deveining shrimp including cutting means, feeding means, means for holding the shrimp in contact with said cutting means, and means for automatically adjusting the depth of the cutting means whereby it is entirely dependent upon the diameter of the shrimp and varies throughout the body portion of the shrimp so that a cut of the desired depth will be made along the entire back of the shrimp.

Yet another object of this invention is in the provision of a machine for deveining shrimp that substantially eliminates waste of meat, that is simple to operate, that accurately cuts or slits the shrimp regardless of their size or shape, that may easily treat sixty or more shrimp per minute and that is sanitary due to the fact that it may be easily cleaned.

These and other objects will be more apparent from the following disclosure when taken in conjunction with the drawings, which form a part thereof.

Referring to the drawings wherein like numerals represent identical elements throughout:

Fig. 1 is a side elevation view of the apparatus embodying the improvements of this invention;

Fig. 2 is a plan view of the apparatus shown in Fig. 1;

Fig. 3 is a plan view of the belts shown in Figs. 1 and 2 for conveying the shrimp from one end of the apparatus to the other end thereof;

Fig. 4 is a diagrammatic view showing the blade for splitting the shrimp together with a member which holds the shrimp in position and assists in conveying same;

Fig. 5 is a diagrammatic view illustrating how the holding and conveying member may be raised and lowered;

Fig. 6 is a detached enlarged detail view partly in section of an equalizer portion of the apparatus shown in Figs. 1 and 2;

Fig. 7 is a detached sectional enlarged detail view of the apparatus illustrating a shrimp beneath the holding and conveying member and the blade;

Fig. 8 is a side view illustrating the construction of the teeth on the outer periphery of the holding and conveying member;

Fig. 9 is a front view of a portion of the member shown in Fig. 8;

Fig. 10 is a detached semi-diagrammatic view of a slightly modified embodiment of the invention illustrating automatic means for raising and lowering the cutting or splitting blade;

Fig. 11 is a semi-diagrammatic plan view of a portion of the apparatus shown in Fig. 10; and Fig. 12 is a detached view partly in section of an alternative manual means for adjusting the cutting depth of the blade.

As shown in the drawings, where the preferred embodiments are illustrated, the frame of the apparatus is generally represented by numeral 1. The frame disclosed is provided with a body portion 3 upon which the majority of the equipment is supported, the body portion being raised from the floor or ground by leg members 4 which are braced as shown at 5. The frame shown is merely illustrative, and it is to be understood that any suitable type of frame may be used, and, if desired, the frame may be constructed so that it is movable on wheels.

Supported by frame 1 is a motor 6, of any suitable type, for driving shaft 7, shown more clearly in Fig. 2, at a desired speed. The shaft 7 carries a pulley 8 over which runs a belt 9, the belt 9 also running over pulley 11 on shaft 12 of reduction drive unit 13. From unit 13 extends shaft 14 upon which is mounted sprocket wheel 15. Sprocket wheel 15, by means of sprocket chain 16 which runs thereover and over sprocket wheel 17 on shaft 18, drives shaft 18, the latter shaft being mounted for rotation on frame 1 by bearing means 19, 21 and 24, the bearings being supported on frame 3 by means such as shown at 34. Mounted on shaft 18 is a pulley 25 which carries a bevel gear 26 in mesh engagement with gear 27. Also mounted on shaft 18 is a bevel gear 28 which meshes with bevel gear 29. Both gears 27 and 29 are mounted on shafts 32 and 33, respectively, and these shafts are given sturdy and steady rotatable support on bearings (not shown) in frame extensions 35, only one of which is disclosed on the drawing. Carried by shaft 32 is a belt wheel 36 and by shaft 33 is a belt wheel 37, this being more completely shown in Fig. 3. Running over drive wheel 36 is a belt 38, said belt also running over pulley 39, and running over belt wheel 37 is a belt 41 which also runs over a pulley 42. Pulleys 39 and 42 are suitably mounted on bearings (not shown) for rotation on members 43 and 44, respectively, said latters members being in turn supported on body portion 3 by members 45 and 46, respectively. The members 45 and 46 are slidable on body portion 3 merely by loosening bolts 47 to vary the tension on the belts 38 and 41.

Pivotally mounted on shaft 18 is a second frame member 48 of substantially rectangular shape and comprising arms 49, each of which at one end thereof rests in a bearing 51 for rotative support on shaft 18. It is to be understood that bearings 24, and 21 and 19 for supporting shaft 18 are raised a considerable distance from frame body portion 3, as shown in Fig. 1. Also, shaft 18 may be readily lubricated, as at 52. Means 53 is provided for bracing arms 49, and mounted adjacent the ends of arms 49 opposite the ends for bearings 51 is a shaft 54. The mounting means for shaft 54 is shown at 55, and it can be seen that by loosening means 55 the shaft may be adjusted lengthwise of the apparatus. A pulley 56 is mounted on bearings 57 for rotative movement, the bearings being supported on shaft 54, and pulley 56 is in driving connection (as shown at 60) with wheel member 58, also provided with the necessary bearing means 59 for rotation. As shown, wheel 58 has an outer peripheral portion 61 and spoke-like brace means 62. A belt 63 runs over pulleys 56 and 25, and the tension of this belt may be varied by lengthwise adjustment of shaft 54 as previously explained. As shown in Figs. 7 and 9, the outer periphery of the wheel member 58 is U-shaped and provided with serrated teeth.

Referring to Figs. 1, 2, 6 and 7, a trough-like member generally represented by numeral 65 is supported on frame portion 3 by any suitable means, such as shown at 66. The section of the trough upon which the shrimp are fed adjacent the motor 6, namely, feeding guide section 67, is inclined and converges into section 68. This latter section is provided with a slit or opening 69, as shown in Figs. 3, 6 and 7, section 68 constituting the remaining length of the body portion of the trough, as shown in Figs. 1 and 2. The trough is generally of slightly concave shape, and the end 70 protrudes far enough to more or less overhang the flushing tank 71, where the shrimp are received after treatment. The tank 71 may be of any suitable type wherein water is fed into compartment 72, such as at 73, to give a circulatory motion to the water in compartment 72. Overflow from compartment 72 may flow to egress compartment 74 through a filter 75, and the sediment, parts of the shrimp shell or other matter from the shrimp collected in compartment 72 may be drained or removed at convenient intervals.

Belt 9 also runs over a pulley 77 supported on shaft 78, said shaft being rotatably supported by bearings 81, only one of which is shown, adjustably secured by means 82 to body portion 3. Mounted for rotation with shaft 78 is cutting or splitting blade 83, and, in operation, means 82 is adjusted whereby blade 83 extends through slit 69 as shown in Figs. 6, 7 and 12. As shown, there is a slight amount of upward tension on blade 83 due to the arrangement shown of pulleys 8, 11 and 77. However, such may be remedied by having a direct drive connection between pulleys 8 and 77. Normally blade 83 extends through slit 69 at least one-eighth of an inch as this is generally the minimum cut made in the shrimp and is based on the fact that the average minimum sized shrimp require a cut of at least this depth for proper deveining. Larger shrimp require deeper cuts, for example, a shrimp one and one-quarter inch in diameter generally requires five-sixteenths of an inch cut, and this may be brought about by adjusting means 82.

The wheel 58 is adapted to move up and down and is positioned, as shown in Figs. 6 and 7, substantially directly above the blade 83. Spring means 100 may be provided to urge wheel 58 downwardly, although the tension of the spring means is slight so that upward movement may be brought about easily. Adjustable stops 84 and 85 of any suitable type are provided to limit the downward movement of wheel 58, whereby the minimum distance between wheel 58 and blade 83 is one-eighth of an inch, and the purpose of this will be hereinafter explained.

As particularly shown in Figs. 1, 2, 3 and 6, lying against or abutting belts 38 and 41, adjacent section 68 of the trough, are L-shaped members 91 and 92. Member 92 is held in position on body portion 3 and trough section 68 by means of extensions 93 and 94, sliding pivot 95 and spring means 96 secured to the frame as at 97. Member 91 has extensions 93¹ and 94¹ and is similarly pivoted and includes spring means 98 having one end attached to frame portion 3 as at 99. Each of the members is provided with stop or inward moving limiting means 101 engageable by the extensions to provide the minimum width of the trough, as seen in Fig. 6. Sliding pivots 95 and 95¹ function to limit the maximum width of the trough, and it is to be understood, of course, that this width may be varied. To provide a slight raising of or floating effect to the slidable members in respect to trough section 68 at one end thereof a lip 80 is provided on the top edge of each of the members 91 and 92 adjacent equalizer 105, as shown in Fig. 6, and the lips rest on the lower equalizer arms 116 and 117 raising shiftable members approximately one-sixteenth inch above section 68 at this end of section 68.

In other words, the sections of belts 38 and 41 adjacent trough section 68 are under tension laterally of the body portion 3 and are normally limited from outward movement laterally, to widen the trough, by the members 91 and 92. Members 91 and 92 are maintained in the desired position, this position, which is the selected minimum width of the trough, will be hereinafter referred to, by an equalizer unit generally represented by numeral 105 and tension means 96 and 97, but any outward lateral force exerted on belts 38 and 41 within trough section 68 will operate the equalizer and/or tension means 96 and 97, causing outward lateral movement of belts 38 and 41, together with members 91 and 92, which are movable due to their sliding pivot support, to widen the position previously referred to, namely, the selected minimum distance between the belts 38 and 41 in trough section 68. Actually when an outward lateral force is applied adjacent equalizer 105, the width of the trough is increased adjacent this point only and vice versa with respect to a force applied at the other end of the trough, such as near tension means 96 and 97, although if such a force is applied near the middle of section 68, the width of the trough increases substantially its entire length.

The equalizer comprises a frame 105 having two stem portions 108 secured by welding, or any other means, to body portion 3. Pivotally mounted to the stem portions 108 at 112 and 113 are U-shaped arms 114 and 115, respectively. The portions 116 and 117 of the arms 114 and 115 abut members 91 and 92, respectively, as shown in Fig. 6, and the portions 109 are pivoted at joint 111. Spring or tension means 118 has one end secured to arm 115 and the other end secured to arm 114, and the tension of this means is such that it creates an inward pull laterally on members 91 and 92 and belts 38 and 41 which overcomes the outward force or pressure of belts 38 and 41 caused by the tensions of belts 38 and 41, the inward pull being limited by stops 101. It is to be understood that member 114 is one solid piece including arms 109 and 116, and the same is true in connection with member 115, both members being pivoted to portions 108. Due to the joint 111, it can be seen that if one of the arms 109 is caused to move downwardly due to outward movement of one of the arms 116 and 117, the other arm will be moved downwardly an equal amount. Spring 118 creates an equal amount of tension on arms 114 and 115, which would not be the case if separate springs for each arm were used unless they each had the exact amount of resiliency.

Therefore, it can be seen that arms 116 and 117 normally hold members 91 and 92 against belts whereby the minimum distance between the belts is normally maintained to accommodate in trough section 68 the average minimum size shrimp, say 30–40 count shrimp. However, in the event a shrimp of larger size passes between belts 38 and 41 at trough section 68, belts 38 and 41 would have to be spread apart to permit passage. This is permitted by the equalizer arrangement shown, and at the same time the distance between the belts, which becomes larger, is such that there is an equal space on either side of the blade 83, or, in other words, the shrimp is centered whereby the blade is adapted to cut or slit the center of the shrimp. For example, if a shrimp of larger size than the minimum opening or passage enters passage 119, the equalizing forces are overcome and belt 38, member 91 and arm 116 or belt 41, member 92 and arm 117 are forced laterally to provide a larger passage 119. Due to joint 111, belt 38, member 91 and arm 116 will move laterally the same amount as belt 41, member 92 and arm 117, no matter which side of the passage the larger shrimp first exerts a lateral force. Therefore, the passage 119 is widened to accommodate the larger shrimp, but the shrimp is still centered over blade 83 and beneath member 58.

Also, due to tension means 118 the belts abut the side of the shrimp. In other words, the lateral force of a larger shrimp overcomes the tension means to permit widening the passage, but after the passage 119 has reached a size to permit the shrimp to enter section 68 the tension means 118 maintains the belts in engagement with the sides of the shrimp for conveying the shrimp in the passage as will hereinafter be described, the belts always functioning this way and appearing as in Fig. 7, unless the size of the shrimp is below the average minimum. Of course, the minimum width of passage 119 may be varied by changing stops 101. The normal setting of passage 119 may be obviously varied to accommodate, in the manner shown in Fig. 6, the majority of the minimum sized shrimp.

As previously explained, the distance between trough 68 and wheel member 58, when it is resting on stops 84 and 85, is such that average smallest shrimp will exert an upward force and raise wheel 58 a definite amount prior to passage between blade 81 and wheel 58. Blade 83 is normally set by adjusting means 82 whereby it extends at least an eighth of an inch above trough section 68, and therefore the shrimp will be slit at its center at least an eighth of an inch. The depth of this cut may be varied by merely adjusting the four means 82, as shown in Figure 1.

In operation motor 6 is started which causes, through pulleys 8 and 77, blade 83 to rotate at a high speed. By the four adjusting means 82, only two of which are shown in Fig. 1, blade 83 is set so that it extends in the trough, as shown in Figs. 6 and 7, about one-eighth of an inch. This selecting of one-eighth of an inch is purely arbitrary, but it has been found that the majority of the smaller shrimp stand a one-eighth inch cut without rupturing, while, of course, larger shrimp easily stand a one-eighth inch cut and actually should be slit or cut deeper to bring about proper deveining.

By means of reduction gear drive 13 and the other drive connections shown, belts 38 and 41 are caused to rotate in synchronism with the speed of rotation of pulley 56, which latter pulley drives holding member 58. Preferably, the speed of rotation of the belts 38 and 41 and holding member 58 is set so that it is roughly one-twentieth of the speed of rotation of the motor 6, while the blade speed is twice the motor speed, although any suitable ratio may be maintained. Incidentally, means 55 and 47 have been shown for adjusting belt tensions, and it is to be understood that the remaining belts in the apparatus may be provided with similar means, or any other suitable means, for regulating the tension of the belts.

Shrimp are fed into trough section 67 by hand, with their backs down and their heads foremost. The shrimp may be de-headed prior to placement on trough 67. The shrimp are manually placed in this manner at the entrance of passage 119 on trough section 68 and between belts 41 and 38. Passage 119 is normally set, as stated before, so that its width corresponds to the average minimum sized shrimp, and, therefore, the belts 41 and 38 carry or convey this size shrimp in the trough section 68 to the cutting means. If a larger sized shrimp enters passage 119, this passage will automatically be enlarged, as previously explained, an amount to permit entry of the shrimp but at the same time, for conveying purposes, the belts provided tightly abut the side portion of the shrimp, and this operation will hereinafter be described.

Assuming the shrimp reaches adjacent blade 83, it can be seen by referring to Fig. 4 that the shrimp's forward movement is assisted by the serrated teeth on the holding member 58. Since the holding member 58 is arranged to be urged upwardly, the shrimp raises member 58 enough to permit its passage between blade 83 and holding member 58, but, at the same time, the holding member 58 holds the shrimp against the blade, due to spring means 100, so that a uniform cut will be made in the back from adjacent the head portion or neck to the tail thereof. The shrimp is then conveyed beyond the cutting means, and no slippage occurs because the teeth of the holding member assist in conveying, at least until the belts 38 and 41 are again able to, by themselves, convey the treated shrimp to the flushing tank 71.

In the flushing tank the swirling water cleans the shrimp, and the shell and any part of the vein that has not been cut away may be easily removed. Cleaning in the flushing tank requires manual operation, but after the shrimp are washed and left in the water a while they are ready for peeling and processing.

Numeral 120 represents a hose through which water is directed on the trough 68 adjacent the cutting means, and the purpose of this hose is to wash away the refuse and to lubricate the various parts. A pan, not shown, may be positioned underneath the frame 3 for receiving excess water or other matter that leaks through the frame. Referring to Fig. 5, it can be seen that holding member 61 may be raised a considerable distance for cleaning of both the trough and the holding member and, in general, to provide access to the various parts.

In the event a shrimp larger than the average minimum size enters the passage 119, the shrimp causes an outward lateral force on either belt 38, shiftable member 91 and arm 116 or on belt 41, shiftable member 92 and arm 117, or on both. In any event, no matter where the force is directed, as previously described, belt 38, member 91 and arm 116 will move an amount identically equal to the movement of arm 117, member 92 and belt 41 to widen the passage 119. The enlarged passage will receive the shrimp in the same manner as the smaller passage receives the smaller shrimp as shown in Fig. 7, and it can be seen, therefore, that the shrimp, no matter what their size be, are absolutely centered within the passage with respect to the blade and the holding member. The operation thereafter is identical as described in connection with shrimp of a smaller size.

It is often necessary to adjust the depth of the cut made in the shrimp for different size shrimp. For example, a shrimp of an inch in diameter should have a slit or cut of one-fourth an inch while the average minimum shrimp needs only a cut of one-eighth of an inch. As explained previously, this adjustment may be made by resetting the adjusting means 82 to raise and lower the cutting mechanism. A simplified form for making this adjustment manually is shown in Fig. 12.

Referring to Fig. 12, numeral 3 represents the body portion of the frame, and depending there-from are extensions 141 and 142, each provided with a recess 143. The blade 83 is supported for rotation on shaft 145 which in turn is mounted in bearings 146. The shaft is driven in the same manner as shown in Fig. 1. Extending from each of the bearings in one direction are arms 148 and extending from each of the bearings in the other direction is bridle-shaped member 149. Extension arms 148 are received in openings 143 and make a close sliding fit therein. A handle member 151 is connected by screw threaded means 154 with the bridle-shaped member 149 and by rotating handle 151 the bridle member is forced upwardly or downwardly depending on the direction of rotation of the handle. This in turn causes upward or downward movement of arms 148 in the recesses 143, and, accordingly, upward or downward movement of blade 83. In other words, by the embodiment shown in Fig. 12 the cutting means may be adjusted upwardly or downwardly to vary the cut in the shrimp by making one adjustment only instead of making four adjustments as shown in Fig 1.

In Figures 10 and 11, an automatic means for adjusting the cutting blade upwardly and downwardly is shown, the movement of the cutting means being, in effect, regulated by the holding means movement. Numeral 6 represents the motor, numerals 3′, 4′, and 5′ sections of the frame, numeral 58′ the holding or pressing means and several parts identical with those shown in Figures 1 and 2 are represented by similar numerals primed. Two pulleys, 160 and 161, are mounted for rotation with shaft 7, pulley 160 being connected by belt 162 with pulley 11′ and pulley 161 being connected to pulley 163 on shaft 164. Therefore, direct driving connections are provided between pulleys 161 and 163 for rotating blade 83′ and a direct driving connection is provided between pulleys 160 and 11′. Shaft 164 is mounted for rotation in bearings 165 (only one of which is shown) that are secured to arm 166 as at 167. Arm 166 is pivotally connected to member 168 secured to leg members 4′. Any type of pivotal connection is suitable but as little play as possible should be maintained. Arm 166 comprises, as shown, two longitudinally extending members 169 pivoted at one end, to member 168, and braced at the other end at 171.

A positive coupling is provided between the arm 166 and frame 49 of the holding member and, as shown, includes pipe or rod 172. If necessary additional rods 172 may be used for coupling but it has been found that one is sufficient. As shown, rod 172 is securely connected to arm 166 and passes through a slot 173 in arm 49 and is maintained in slot 173 but is slidable therein providing a lost motion connection. Spring means 174 connects arm 166 with frame 3 and is for the purpose of limiting the downward movement of arm 166.

Rod 172 is connected to arms 166 and 49 at a position whereby there is a proportional relationship in regard to upward movement of four to one except for the first one-fourth inch upward movement of holding member 58′. In other words, arm 166 is normally positioned, by the tension of spring 174, so that blade 83′ extends upwardly in the slit in trough section 68 one-eighth of an inch. When a shrimp having a maximum diameter of one-half inch, the average minimum size shrimp, is carried by belts 38 and 41 to the holding means, the last named means is raised an amount to permit passage of the shrimp between the blade and holding means, as previously explained. During this upward movement of holding means 58′, the blade is not raised for the reason that rod 172 slides the distance of slot 173, the size of the slot being such to have this condition occur. However, the one-half inch shrimp will be cut one-eighth inch from neck to tail as the blade is set to cut at least a one-eighth inch deep cut.

Assuming a shrimp having a diameter of one and one-fourth inches adjacent the neck thereof and three-fourths of an inch adjacent the tail thereof now enters passage 119, the larger diameter first. Holding member 58′ will be raised an amount to permit passage. During the first one-fourth of an inch upward movement, the holding means is preferably held one-eighth of an inch from the blade or one-fourth of an inch above the trough due to the stop means 84—85, the blade will not be urged upwardly. But during the next three-fourths of an inch upward movement, the blade will be raised three-sixteenths of an inch due to the four-to-one ratio. Accordingly, the cut will be five-sixteenths of an inch deep adjacent the neck portion. At the tail portion of the shrimp a cut of three-sixteenths of an inch should be made and this is exactly what happens, as due to the ratio of four to one, blade 83 will be raised one-sixteenth of an inch when the distance between holding means 58 and the frame 3 is three-fourths of an inch. The intermediate diameter of the shrimp will also receive a different depth cut. At the one inch diameter of the shrimp a cut of one-fourth of an inch will be made. Accordingly, the depth of the cut made in the shrimp will vary from neck to tail thereof.

It has been found that best deveining is obtained if the cuts are the following depths in accordance with the following diameters:

| | |
|---|---|
| ½″ diameter | ⅛″ cut |
| ¾″ diameter | 3/16″ cut |
| 1″ diameter | ¼″ cut |
| 1¼″ diameter | 5/16″ cut |

Now, assuming the average minimum size shrimp has a maximum one-half inch diameter. In this instance it has been found preferably to make a one-eighth of an inch cut at the maximum diameter of the shrimp and throughout the body of the shrimp, even where the shrimp has a diameter of much less than one-half inch, as waste is not too critical with such a small shrimp. This is why the blade 83 is preferably set to cut at least one-eighth of an inch. However, for diameters larger than one-half an inch a cut of more than one-eighth of an inch is required for proper deveining and the cut should be varied to prevent cutting away meat which results in waste, in accordance with the diameter. The automatic adjusting means shown in Figures 10 and 11 accomplishes this and, due primarily to the positioning of rod 172, the ratio of four to one, previously mentioned, exists. However, it is to be understood that it is within the scope of this invention to change the ratio by varying the position of rod 172. Also, it is within the scope of this invention to position blade 83 so that it does not normally extend through the trough slit one-eighth of an inch but instead is raised a proportional amount by holding member 58 during the first part of its upward travel. Still further it is not essential that holding means be maintained, by stops 84 and 85, one-eighth of an inch above the blade 83. In other words, the illustrated positioning of parts, the preferred ratio described, and the arrangement whereby the blade is not raised until the distance between the holding means and frame is one-half an inch have been described in detail as they have been found to provide the best results. However, the invention is not to be considered limited to these preferences.

Instead of a rigid coupling 172, a chain or other means could be used to couple arms 166 and 49. Also, the positioning of parts has been described considerably in connection with a shrimp of an average minimum size, namely, one having a maximum diameter of one-half inch. It is to be understood that the essential elements of the apparatus may be adjusted as the size of the average minimum sized shrimp varies from time to time.

It will, of course, be obvious that this application is not limited to the exact structure and operation described herein, but it is intended to serve as a disclosure of representative apparatus and operation. Formal changes may be made in the specific embodiments shown and described without departing from the spirit or substance of the broad invention, the scope of which is commensurate with the appended claims.

As used throughout the specification, diameter is meant to be construed as the distance between the belly portion and the back of the shrimp. Also, the feeding guide section 67 is primarily for facilitating placing the shrimp in trough section 68 and to protect the operator from the danger of pulleys 39 and 42 and belts 38 and 41. Equalizer 105 accurately centers the shrimp adjacent the cutting means as previously described. Tension means 96 and 97 also maintain the belts against the sides of the shrimp, no matter the size thereof, but it is clear that the tension means does not accurately center the shrimp with respect to the cutting means as does the equalizer because a lateral force exerted on one side of the trough might move one tension means 96 or 97 more than the other tension means, although the tension means serves the purpose of holding the belts 38 and 41 tight enough against the shrimp to convey same to the flushing tank.

We claim:

1. Apparatus for deveining shrimp comprising a frame having a trough into which the shrimp are placed, means connected to said frame for feeding said shrimp through said trough, means associated with said frame for cutting said shrimp as they pass through said trough, and rotatable means on said frame opposed to said cutting means for holding said shrimp in contact with said cutting means during the cutting operation, and equalizer means associated with said trough for maintaining the shrimp centered between said cutting means and holding means regardless of the size of said shrimp, members slidably pivoted to said frame abutting said feeding means, said equalizer means comprising pivoted members under tension and engaging said slidable members for normally maintaining said slidable members and feeding means in a desired position but permitting outward movement thereof, said pivoted members comprising U-shaped arms, one end of each arm engaging one of said slidable members and the other ends of the arms being connected together for pivotal movement about a common point.

2. Apparatus for deveining shrimp comprising a frame having a trough into which the shrimp are placed, means connected to said frame for feeding said shrimp through said trough, means associated with said frame for cutting said shrimp as they pass through said trough, and rotatable means on said frame opposed to said cutting means for holding said shrimp in contact with said cutting means during the cutting operation, and equalizer means associated with said trough for maintaining the shrimp centered between said cutting means and holding means regardless of the size of said shrimp, members slidably pivoted to said frame abutting said feeding means, said equalizer means comprising pivoted members under tension and engaging said slidable members for normally maintaining said slidable members and feeding means in a desired position but permitting outward movement thereof, stop means on said frame, and said slidable members having extensions engageable with said stop means for limiting the minimum size of said trough.

3. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, and means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, means connecting said arm to said rotatable means at the end opposite its pivot, and a lost motion connection at the point of connection of said arm with said rotatable means.

4. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, and means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, and means connecting said arm to said rotatable means at the end opposite its pivot.

5. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, and means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, and means connecting said arm to said rotatable means at the end opposite its pivot, said rotatable shrimp holding means hving a plurality of serrated teeth.

6. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, and means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, and means connecting said arm to said rotatable means at the end opposite its pivot, said rotatable shrimp holding means having a plurality of serrated spaced teeth.

7. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, and means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, and means connecting said arm to said rotatable means at the end opposite its pivot, said trough including a plurality of belts, means for driving said rotatable shrimp holding means and said belts at substantially the same speed.

8. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, means connecting said arm to said rotatable means at the end opposite its pivot, said trough including a plurality of belts, means for driving said rotatable shrimp holding means and said belts at substantially the same speed, and means for driving said cutting means at a faster speed than said last mentioned means.

9. Apparatus for deveining shrimp comprising a frame having a trough into which the shrimp are placed, means connected to said frame for feeding the shrimp through said trough, means associated with said frame for cutting the shrimp as they pass through said trough, rotatable means on said frame opposed to said cutting means for holding said shrimp in contact with said cutting means during the cutting operation, means automatically actuated by said rotatable shrimp holding means for adjusting the position of said cutting means with respect to said frame whereby the depth of cut may be varied according to the diameter of each shrimp treated, said adjustable means comprising a pivoted arm, said cutting means being rotatably mounted on said arm, means connecting said arm to said rotatable means at the end opposite its pivot, and spring means for biasing said means for holding said shrimp toward said shrimp cutting means.

References Cited in the file of this patent

UNITED STATES PATENTS

| Number | Name | Date |
|---|---|---|
| 2,140,575 | David et al. | Dec. 20, 1938 |
| 2,263,696 | Grayson | Nov. 25, 1941 |
| 2,293,133 | Halferty | Aug. 18, 1942 |